United States Patent
Kohler et al.

(10) Patent No.: US 9,100,480 B2
(45) Date of Patent: Aug. 4, 2015

(54) ADJUSTMENT OF CONTACT ROUTING DECISIONS TO REWARD AGENT BEHAVIOR

(75) Inventors: Joylee Kohler, Northglenn, CO (US); Andrew D. Flockhart, Thornton, CO (US); Robert C. Steiner, Broomfield, CO (US)

(73) Assignee: Avaya Inc., Basking Ridge, NJ (US)

( * ) Notice: Subject to any disclaimer, the term of this patent is extended or adjusted under 35 U.S.C. 154(b) by 98 days.

(21) Appl. No.: 13/408,782

(22) Filed: Feb. 29, 2012

(65) Prior Publication Data

US 2013/0223610 A1 Aug. 29, 2013

(51) Int. Cl.
*H04M 3/00* (2006.01)
*H04M 3/51* (2006.01)
*H04M 3/523* (2006.01)

(52) U.S. Cl.
CPC .......... *H04M 3/5175* (2013.01); *H04M 3/5238* (2013.01)

(58) Field of Classification Search
CPC ... H04M 3/51; H04M 3/5183; H04M 3/5191; H04M 3/5175; H04M 3/523; H04M 3/5232; H04M 3/5233; H04M 2203/40; H04M 2203/401; H04M 2203/402; H04M 2203/405; H04M 2203/408; G06Q 10/06; G06Q 10/0639; G06Q 10/06398; G06Q 10/06393; G06Q 10/063116

USPC ............. 379/265.01, 265.02, 265.05, 265.06, 379/265.11, 265.12

See application file for complete search history.

(56) References Cited

U.S. PATENT DOCUMENTS

| | | | |
|---|---|---|---|
| 6,049,779 A * | 4/2000 | Berkson | 705/14.39 |
| 2002/0123925 A1* | 9/2002 | Smith | 705/14 |
| 2006/0062374 A1* | 3/2006 | Gupta | 379/265.06 |
| 2006/0153356 A1* | 7/2006 | Sisselman et al. | 379/265.12 |
| 2006/0182258 A1 | 8/2006 | Sisselman et al. | |
| 2010/0235218 A1 | 9/2010 | Erhart et al. | |
| 2010/0296417 A1 | 11/2010 | Steiner | |
| 2010/0332281 A1 | 12/2010 | Horvitz et al. | |
| 2011/0125793 A1 | 5/2011 | Erhart et al. | |
| 2011/0125826 A1 | 5/2011 | Erhart et al. | |
| 2011/0255683 A1 | 10/2011 | Flockhart et al. | |
| 2013/0142322 A1* | 6/2013 | Grasso et al. | 379/265.08 |

* cited by examiner

*Primary Examiner* — Antim Shah
(74) *Attorney, Agent, or Firm* — Sheridan Ross P.C.

(57) ABSTRACT

A contact center is described along with various methods and mechanisms for administering the same. The contact center proposed herein provides the ability to, among other things, reward positive agent behavior and performance by providing the agent with rewards and incentives. The rewards and incentives are provided to the agent by altering one or more aspects of the routing logic in the contact center.

17 Claims, 5 Drawing Sheets

ADJUSTMENT OF CONTACT ROUTING DECISIONS TO REWARD AGENT BEHAVIOR

FIELD OF THE DISCLOSURE

The present disclosure is generally directed toward communications and more specifically toward contact centers.

BACKGROUND

In the contact center environment there has always been a desire to provide positive feedback for good agent behavior. In fact, work force optimization is desirable beyond the contact center environment. However, most of the agent rewards previously contemplated have not specifically leveraged the call routing functionality as the mechanism for rewarding agent behavior.

For example, U.S. Patent Publication No. 2010/00332281, the entire contents of which are hereby incorporated herein by reference, describes that a task may be formulated as a game to assist the agent in completing the task. The game presents the progress of the agent through the task. This publication also discloses that the agent may be rewarded for high-quality performance of the task, but all of the rewards are related to completing the task assigned to the agent.

Common management techniques may also involve providing employees with benefits to reward good behavior/performance. Typical benefits involve monetary benefits, vacation, etc. None of the currently-available contact center solutions provide the ability to leverage call routing functions to reward positive agent behavior.

SUMMARY

It is with respect to the above issues and other problems that the embodiments presented herein were contemplated. In particular, embodiments of the present disclosure provide a number of different agent rewards for good behavior. Specifically, if an agent or group of agents meet certain goals, criteria, objectives, etc., then any one or more of the following rewards may be provided to the agent or group of agents: (1) alter contact routing logic to give agent preferred work (based on agent's defined preferences for a type of work) for the rest of the day, week, month, etc.; (2) alter contact routing logic to give agent extended breaks; (3) alter contact routing logic to provide the agent with a video clip, audio clip, etc. in between being assigned work items; (4) alter contact routing logic to discontinue outbound calling program for the agent for the rest of the day, week, month, etc.; (5) alter contact routing logic to allow agent to select which type of work to receive (potentially based on the next X number of work items in queue); and (6) any combination of the above.

The types of goals that may be analyzed for rewarding behavior could include, but are not limited to: (1) whether the agent or group of agents are meeting certain Key Performance Indicator (KPI) metrics; (2) whether the agent is successfully multi-tasking; (3) whether the agent is adhering to a prescribed work schedule; (4) whether (or not) the agent is shifting their break time; (5) whether the agent is working overtime or taking calls even though they are in an AUX state; and (6) any combination of the above.

As can be appreciated, a number of other types of rewards may be provided and the type of reward which is provided may depend upon the good behavior. Additionally, the rules for providing rewards may be kept secret from the agents but may be easily administered by the contact center administrator or manager and the rules may be changed at any time either in response to receiving a user input or based on conditions of the contact center.

In a non-limiting example, a contact center agent may work on commission and after that agent has met her sales quota for the day the agent may be eligible to receive one or more rewards. In particular, when the agent becomes available, the work item routing logic of the contact center may be altered such that rather than assigning the agent the next work item from a work item pool, the agent may be provided with a list of the top ten high revenue customers that are waiting in the work pool, regardless of the wait time that each customer/work item has endured. A list of the top ten high revenue customers may be presented to the agent along with additional attributes which describe, in some level of detail, the nature of the work item (e.g., wait time, customer information, sales history, projected revenue, etc.). The agent may review the list and select any contact from the list. Upon receiving the agent's selection, the work item routing logic may assign the selected work item to the agent, irrespective of the amount of time that the work items have been waiting for service.

In accordance with at least some embodiments of the present disclosure, a method is provided which generally comprises:

determining that an agent has met a performance goal in a contact center that is defined by one or more performance thresholds;

based on determining that the agent has met the performance goal, identifying a reward which the agent is eligible to receive; and altering a routing logic of a work assignment mechanism in the contact center so as to provide the agent with the reward.

The phrases "at least one", "one or more", and "and/or" are open-ended expressions that are both conjunctive and disjunctive in operation. For example, each of the expressions "at least one of A, B and C", "at least one of A, B, or C", "one or more of A, B, and C", "one or more of A, B, or C" and "A, B, and/or C" means A alone, B alone, C alone, A and B together, A and C together, B and C together, or A, B and C together.

The term "a" or "an" entity refers to one or more of that entity. As such, the terms "a" (or "an"), "one or more" and "at least one" can be used interchangeably herein. It is also to be noted that the terms "comprising", "including", and "having" can be used interchangeably.

The term "automatic" and variations thereof, as used herein, refers to any process or operation done without material human input when the process or operation is performed. However, a process or operation can be automatic, even though performance of the process or operation uses material or immaterial human input, if the input is received before performance of the process or operation. Human input is deemed to be material if such input influences how the process or operation will be performed. Human input that consents to the performance of the process or operation is not deemed to be "material".

The term "computer-readable medium" as used herein refers to any tangible storage that participates in providing instructions to a processor for execution. Such a medium may take many forms, including but not limited to, non-volatile media, volatile media, and transmission media. Non-volatile media includes, for example, NVRAM, or magnetic or optical disks. Volatile media includes dynamic memory, such as main memory. Common forms of computer-readable media include, for example, a floppy disk, a flexible disk, hard disk, magnetic tape, or any other magnetic medium, magneto-optical medium, a CD-ROM, any other optical medium, punch cards, paper tape, any other physical medium with patterns of holes, a RAM, a PROM, and EPROM, a FLASH-EPROM, a solid state medium like a memory card, any other memory chip or cartridge, or any other medium from which a computer can read. When the computer-readable media is configured as a database, it is to be understood that the database may be any type of database, such as relational, hierarchical, object-oriented, and/or the like. Accordingly, the disclosure is considered to include a tangible storage medium and prior art-recognized equivalents and successor media, in which the software implementations of the present disclosure are stored.

The terms "determine", "calculate", and "compute," and variations thereof, as used herein, are used interchangeably and include any type of methodology, process, mathematical operation or technique.

The term "module" as used herein refers to any known or later developed hardware, software, firmware, artificial intelligence, fuzzy logic, or combination of hardware and software that is capable of performing the functionality associated with that element. Also, while the disclosure is described in terms of exemplary embodiments, it should be appreciated that individual aspects of the disclosure can be separately claimed.

BRIEF DESCRIPTION OF THE DRAWINGS

The present disclosure is described in conjunction with the appended figures.

DETAILED DESCRIPTION

The ensuing description provides embodiments only, and is not intended to limit the scope, applicability, or configuration of the claims. Rather, the ensuing description will provide those skilled in the art with an enabling description for implementing the embodiments. It being understood that various changes may be made in the function and arrangement of elements without departing from the spirit and scope of the appended claims.

Figure 1:
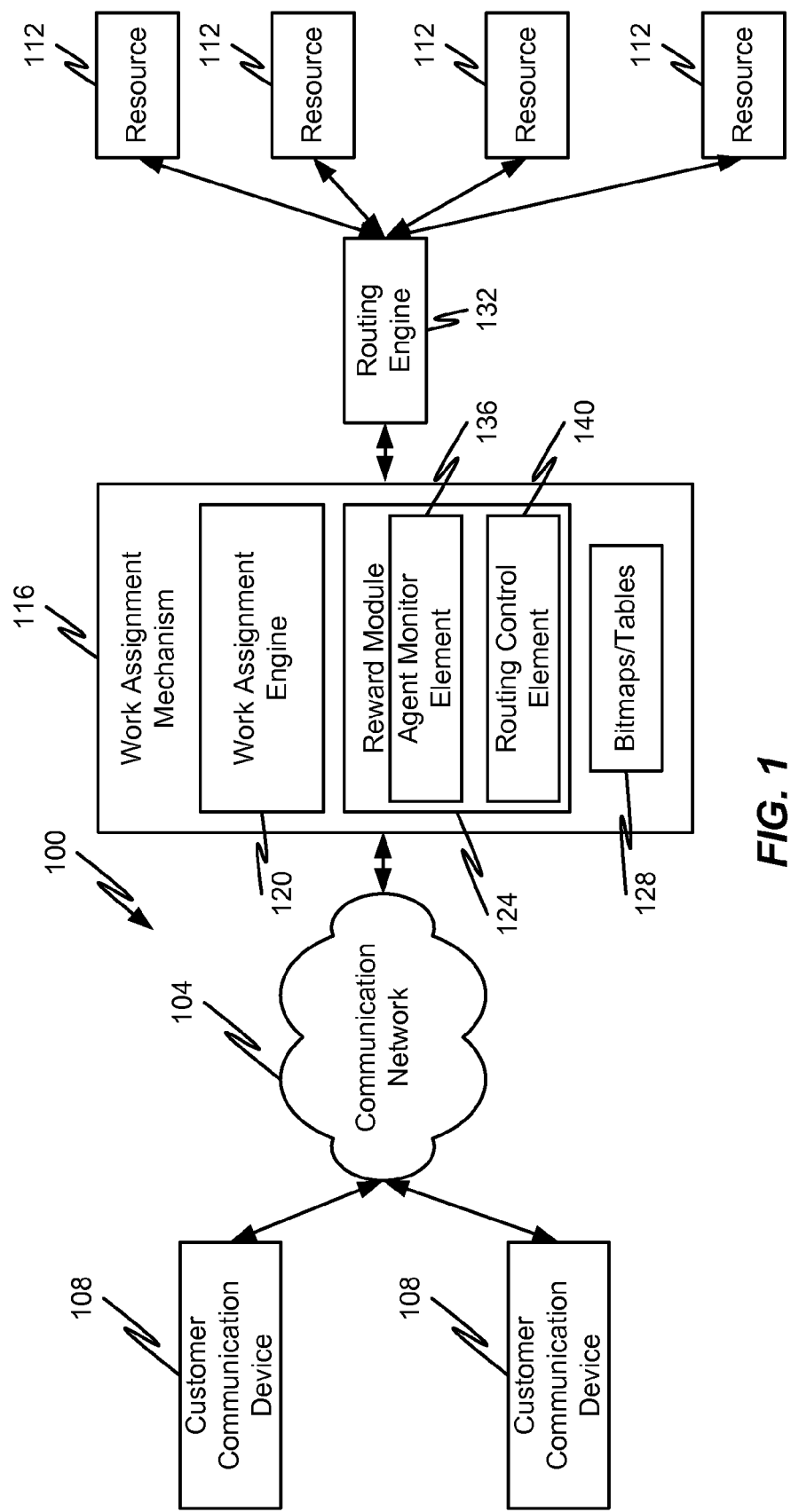
FIG. 1 is a block diagram of a communication system in accordance with embodiments of the present disclosure.

FIG. 1 shows an illustrative embodiment of a communication system 100 in accordance with at least some embodiments of the present disclosure. The communication system 100 may be a distributed system and, in some embodiments, comprises a communication network 104 connecting one or more communication devices 108 to a work assignment mechanism 116, which may be owned and operated by an enterprise administering a contact center in which a plurality of resources 112 are distributed to handle incoming work items (in the form of contacts) from the customer communication devices 108.

In accordance with at least some embodiments of the present disclosure, the communication network 104 may comprise any type of known communication medium or collection of communication media and may use any type of protocols to transport messages between endpoints. The communication network 104 may include wired and/or wireless communication technologies. The Internet is an example of the communication network 104 that constitutes an Internet Protocol (IP) network consisting of many computers, computing networks, and other communication devices located all over the world, which are connected through many telephone systems and other means. Other examples of the communication network 104 include, without limitation, a standard Plain Old Telephone System (POTS), an Integrated Services Digital Network (ISDN), the Public Switched Telephone Network (PSTN), a Local Area Network (LAN), a Wide Area Network (WAN), a Session Initiation Protocol (SIP) network, a cellular network, and any other type of packet-switched or circuit-switched network known in the art. In addition, it can be appreciated that the communication network 104 need not be limited to any one network type, and instead may be comprised of a number of different networks and/or network types. As one example, embodiments of the present disclosure may be utilized to increase the efficiency of a grid-based contact center. Examples of a grid-based contact center are more fully described in U.S. patent application Ser. No. 12/469,523 to Steiner, the entire contents of which are hereby incorporated herein by reference. Moreover, the communication network 104 may comprise a number of different communication media such as coaxial cable, copper cable/wire, fiber-optic cable, antennas for transmitting/receiving wireless messages, and combinations thereof.

The communication devices 108 may correspond to customer communication devices. In accordance with at least some embodiments of the present disclosure, a customer may utilize their communication device 108 to initiate a work item, which is generally a request for a processing resource 112. Exemplary work items include, but are not limited to, a contact directed toward and received at a contact center, a web page request directed toward and received at a server farm (e.g., collection of servers), a media request, an application request (e.g., a request for application resources location on a remote application server, such as a SIP application server), and the like. The work item may be in the form of a message or collection of messages transmitted over the communication network 104. For example, the work item may be transmitted as a telephone call, a packet or collection of packets (e.g., IP packets transmitted over an IP network), an email message, an Instant Message, an SMS message, a fax, and combinations thereof.

In some embodiments, the communication may not necessarily be directed at the work assignment mechanism 116, but rather may be on some other server in the communication network 104 where it is harvested by the work assignment mechanism 116, which generates a work item for the harvested communication. An example of such a harvested communication includes a social media communication that is harvested by the work assignment mechanism 116 from a social media network or server. Exemplary architectures for harvesting social media communications and generating work items based thereon are described in U.S. patent application Ser. Nos. 12/784,369, 12/706,942, and 12/707,277, filed Mar. 20, 1010, Feb. 17, 2010, and Feb. 17, 2010, respectively, each of which are hereby incorporated herein by reference in their entirety.

The format of the work item may depend upon the capabilities of the communication device 108 and the format of the communication. In some embodiments, work items are logical representations within a contact center of work to be performed in connection with servicing a communication received at the contact center (and more specifically the work assignment mechanism 116). The communication associated with a work item may be received and maintained at the work assignment mechanism 116, a switch or server connected to the work assignment mechanism 116, or the like until a resource 112 is assigned to the work item representing that communication at which point the work assignment mechanism 116 passes the work item to a routing engine 132 to connect the communication device 108 which initiated the communication with the assigned resource 112.

Although the routing engine 132 is depicted as being separate from the work assignment mechanism 116, the routing engine 132 may be incorporated into the work assignment mechanism 116 or its functionality may be executed by the work assignment engine 120.

In accordance with at least some embodiments of the present disclosure, the communication devices 108 may comprise any type of known communication equipment or collection of communication equipment. Examples of a suitable communication device 108 include, but are not limited to, a personal computer, laptop, Personal Digital Assistant (PDA), cellular phone, smart phone, telephone, or combinations thereof. In general each communication device 108 may be adapted to support video, audio, text, and/or data communications with other communication devices 108 as well as the processing resources 112. The type of medium used by the communication device 108 to communicate with other communication devices 108 or processing resources 112 may depend upon the communication applications available on the communication device 108.

In accordance with at least some embodiments of the present disclosure, the work item is sent toward a collection of processing resources 112 via the combined efforts of the work assignment mechanism 116 and routing engine 132. The resources 112 can either be completely automated resources (e.g., Interactive Voice Response (IVR) units, processors, servers, or the like), human resources utilizing communication devices (e.g., human agents utilizing a computer, telephone, laptop, etc.), or any other resource known to be used in contact centers.

As discussed above, the work assignment mechanism 116 and resources 112 may be owned and operated by a common entity in a contact center format. In some embodiments, the work assignment mechanism 116 may be administered by multiple enterprises, each of which has their own dedicated resources 112 connected to the work assignment mechanism 116.

In some embodiments, the work assignment mechanism 116 comprises a work assignment engine 120 which enables the work assignment mechanism 116 to make intelligent routing decisions for work items. In some embodiments, the work assignment engine 120 is configured to administer and make work assignment decisions in a queueless contact center, as is described in U.S. patent application Ser. No. 12/882,950, the entire contents of which are hereby incorporated herein by reference.

More specifically, the work assignment engine 120 can generate bitmaps/tables 128 and determine, based on an analysis of the bitmaps/tables 128, which of the plurality of processing resources 112 is eligible and/or qualified to receive a work item and further determine which of the plurality of processing resources 112 is best suited to handle the processing needs of the work item (unless the assigned work item is a break-type work item in which case the determination of the best suited resource 112 corresponds to a most-deserving resource for the break). In situations of work item surplus, the work assignment engine 120 can also make the opposite determination (i.e., determine optimal assignment of a work item to a resource). In some embodiments, the work assignment engine 120 is configured to achieve true one-to-one matching by utilizing the bitmaps/tables 128 and any other similar type of data structure.

The work assignment engine 120 may reside in the work assignment mechanism 116 or in a number of different servers or processing devices. In some embodiments, cloud-based computing architectures can be employed whereby one or more components of the work assignment mechanism 116 are made available in a cloud or network such that they can be shared resources among a plurality of different users.

In addition to comprising the work assignment engine 120, the work assignment mechanism 116 may also comprise a reward module 124. The reward module 124 may include one or more elements or instruction sets that enable the reward module 124 to identify when an agent is eligible to receive a reward, identify one or more rewards to provide to the agent, and then alter the work assignment engine 120 so as to provide the eligible agent with the identified reward.

Specifically, the reward module 124 may include an agent monitor element 136 and a routing control element 140. The agent monitor element 136 may be responsible for monitoring one or more agent performance metrics (e.g., KPIs, schedule adherence, overall profitability, skill improvements, etc.) for some or all agents in the contact center 100. The agent monitor element 136 may then compare the one or more agent performance metrics with one or more reward thresholds to determine if an agent is eligible for a reward and, if so, the type of reward for which the agent is eligible.

The routing control element 140 may be responsible for assessing the type of reward that has been identified by the agent monitor element 136 and mapping the type of reward to a control action for the work assignment engine 120. Specifically, depending upon the type of reward, the routing control element 140 may identify what types of instructions to send to the work assignment engine 120 so as to enable the work assignment engine 120 to deliver the identified reward to the eligible agent.

As can be appreciated, the reward module 124 and/or bitmaps/tables 128 may be internal to the work assignment mechanism 116 or they may be separate from the work assignment mechanism 116.

Figure 2:
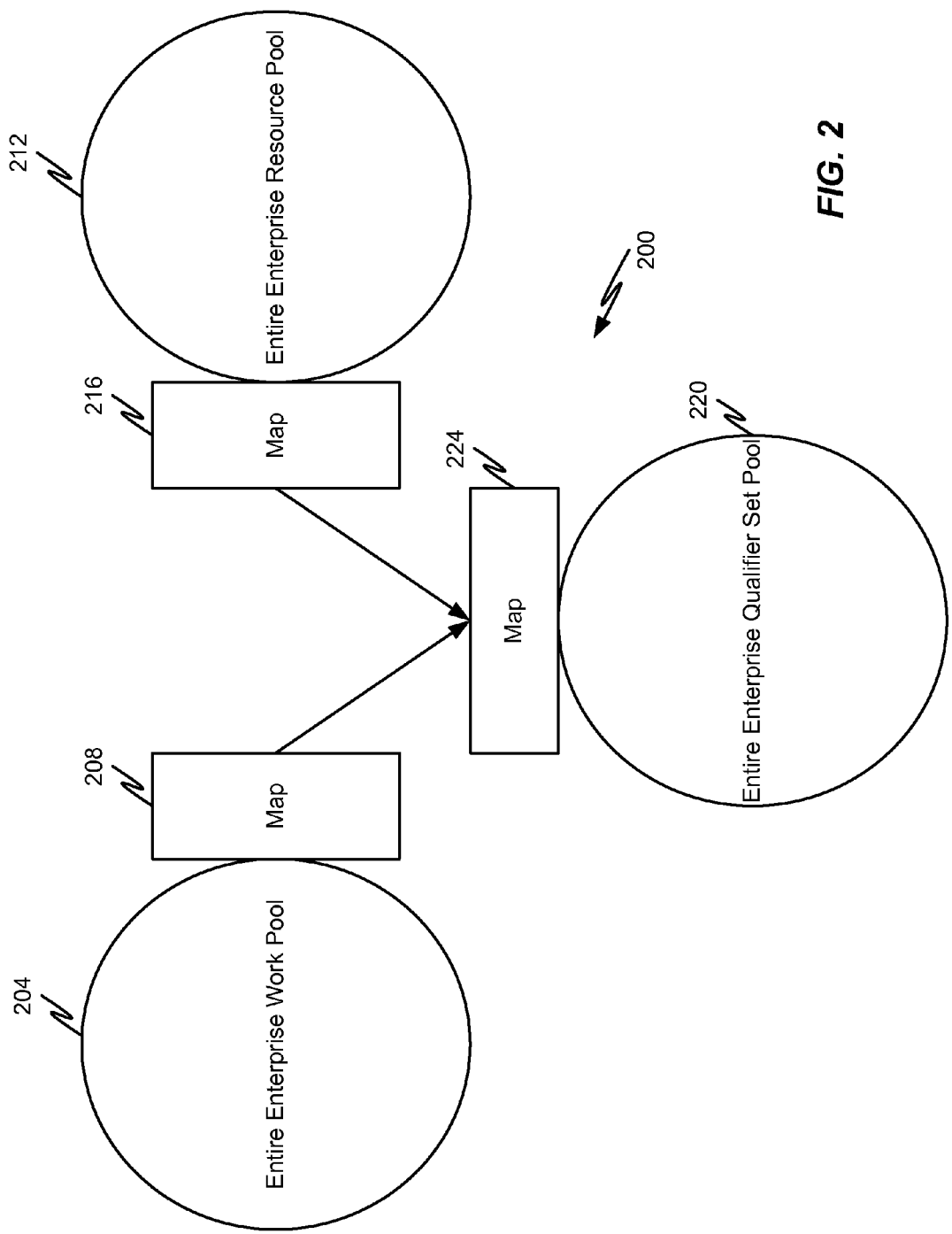
FIG. 2 is a block diagram depicting pools and bitmaps that are utilized in accordance with embodiments of the present disclosure.

FIG. 2 depicts exemplary data structures 200 which may be incorporated in or used to generate the bitmaps/tables 128 used by the work assignment engine 120. The exemplary data structures 200 include one or more pools of related items. In some embodiments, three pools of items are provided, including an enterprise work pool 204, an enterprise resource pool 212, and an enterprise qualifier set pool 220. The pools are generally an unordered collection of like items existing within the contact center. Thus, the enterprise work pool 204 comprises a data entry or data instance for each work item within the contact center 100 at any given time.

In some embodiments, the population of the work pool 204 may be limited to work items waiting for service by or assignment to a resource 112, but such a limitation does not necessarily need to be imposed. Rather, the work pool 204 may contain data instances for all work items in the contact center regardless of whether such work items are currently assigned and being serviced by a resource 112 or not. The differentiation between whether a work item is being serviced (i.e., is assigned to a resource 112) may simply be accounted for by altering a bit value in that work item's data instance. Alteration of such a bit value may result in the work item being disqualified for further assignment to another resource 112 unless and until that particular bit value is changed back to a value representing the fact that the work item is not assigned to a resource 112, thereby making that resource 112 eligible to receive another work item.

Similar to the work pool 204, the resource pool 212 comprises a data entry or data instance for each resource 112 within the contact center. Thus, resources 112 may be accounted for in the resource pool 212 even if the resource 112 is ineligible due to its unavailability because it is assigned to a work item or because a human agent is not logged-in. The ineligibility of a resource 112 may be reflected in one or more bit values.

The qualifier set pool 220 comprises a data entry or data instance for each qualifier set within the contact center. In some embodiments, the qualifier sets within the contact center are determined based upon the attributes or attribute combinations of the work items in the work pool 204. Qualifier sets generally represent a specific combination of attributes for a work item. In particular, qualifier sets can represent the processing criteria for a work item and the specific combination of those criteria. Each qualifier set may have a corresponding qualifier set identified "qualifier set ID" which is used for mapping purposes. As an example, one work item may have attributes of language=French and intent=Service and this combination of attributes may be assigned a qualifier set ID of "12" whereas an attribute combination of language=English and intent=Sales has a qualifier set ID of "13." The qualifier set IDs and the corresponding attribute combinations for all qualifier sets in the contact center may be stored as data structures or data instances in the qualifier set pool 220.

In some embodiments, one, some, or all of the pools may have a corresponding bitmap. Thus, a contact center may have at any instance of time a work bitmap 208, a resource bitmap 216, and a qualifier set bitmap 224. In particular, these bitmaps may correspond to qualification bitmaps which have one bit for each entry. Thus, each work item in the work pool 204 would have a corresponding bit in the work bitmap 208, each resource 112 in the resource pool 212 would have a corresponding bit in the resource bitmap 216, and each qualifier set in the qualifier set pool 220 may have a corresponding bit in the qualifier set bitmap 224.

In some embodiments, the bitmaps are utilized to speed up complex scans of the pools and help the work assignment engine 120 make an optimal work item/resource assignment decision based on the current state of each pool. Accordingly, the values in the bitmaps 208, 216, 224 may be recalculated each time the state of a pool changes (e.g., when a work item surplus is detected, when a resource surplus is detected, etc.).

Figure 3:
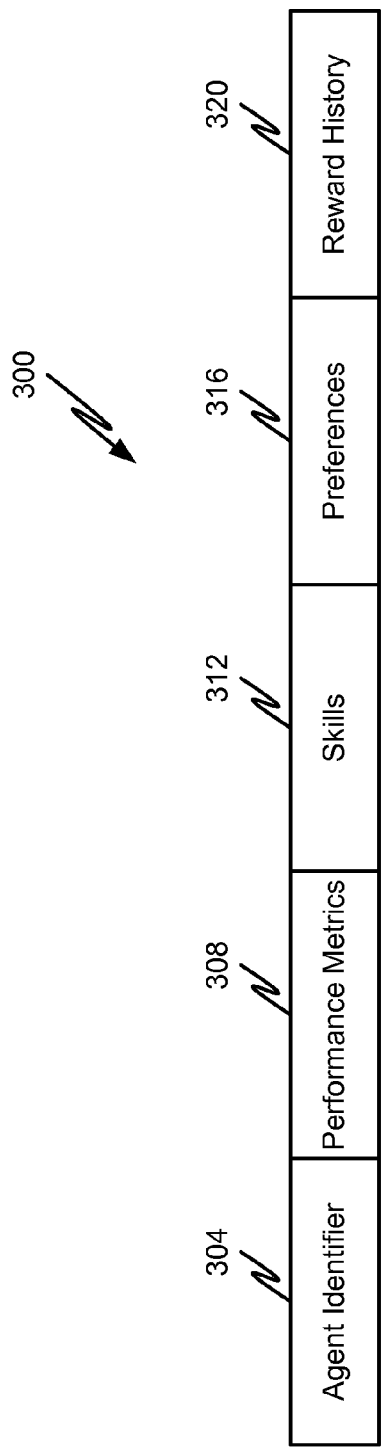
FIG. 3 is a block diagram depicting a first data structure used in accordance with embodiments of the present disclosure.

With reference now to FIG. 3, additional details of a data structure 300 used to define agents or agent-based information will be described in accordance with embodiments of the present disclosure. The data structure 300 may include an agent identifier field 304, a performance metrics field 308, a skills field 312, a preferences field 316, and a reward history field 320.

The agent identifier field 304 may comprise information which uniquely identifies an agent within a contact center or a group of agents within a contact center. In some embodiments, the agent identifier field 304 may include identification information such as a name, number, or any other data which can be used to identify an agent in a contact center. The agent identifier filed 304 may also comprise information which describes information about the agent (e.g., employment history, gender, etc.) that is not necessarily relevant to routing contacts in the contact center but may still be maintained in an employee database.

The performance metrics field 308 may comprise information which describes an agent's current or historical (e.g., past hour, day, week, month, quarter, year, last work item, etc.) performance within the contact center. In some embodiments, the performance metrics field 308 may comprise KPI information that is obtained from the work assignment engine 120 or from some other analysis and reporting module running within the contact center. As used herein, KPIs may include, without limitation, any metric or combination of metrics that define performance of an entity within a contact center (e.g., a contact center agent, a group of contact center agents, etc.). Specifically, a KPI can be defined in terms of making progress toward strategic goals or simply the repeated achievement of some level of an operational goal.

In a contact center context, KPIs may vary depending upon whether work items correspond to outbound contacts (e.g., contacts originated by the contact center) or inbound contacts (e.g., contacts received at the contact center that have been originated outside the contact center). Non-limiting examples of outbound contact KPIs include: Contacts per hour—Average number of customers a call center agent was able to contact within an hour; Leads Conversion Rate—The percentage of leads that actually converted to sales; Hourly Sales—The average amount of sales the call center representative was able to close in an hour; Daily Sales—The average value of sales the agent was able to close in a day; and Accuracy—Extent to which a contact has been handled according to a predetermined script.

Non-limiting examples of inbound contact KPIs include: Real time Q—Metrics; Calls per hour—The average number of calls the agent is able to take per hour; Saves/One-Call Resolutions—The number of times our agents are able to resolve an issue immediately within the first phone call. Colloquially referred to as "one-and-done" calls; Average Handle Time—How long it takes for one call to be handled, which includes the call time itself, plus the work done after that call; Average Wait Time—How long a caller is put on hold before a call center agent becomes available to take the call; Accuracy; Abandonment Rate—This is the percentage of customers who disconnected before an agent was able to intercept the call; and Completion Rate—The ratio of successfully finished calls to the number of attempted calls by the customer.

Other types of KPIs that are not necessarily specific to inbound or outbound contacts include, without limitation, customer satisfaction level, customer service level, average speed of answer, contact forecast precision level, quality of services rendered, average handling cost of a contact, agent occupancy ratio, schedule adherence and conformity, and time distribution (in service, non-service detailed time or "shrinkage"). Other examples include number of times calls are put on hold, number of transfers, $/min, $/call, number of upsells, number of cross-sells, percentages thereof, etc.

The skills information field 312 may comprise information which describes one or more skills assigned to or associated with an agent or group of agents. In particular, the skills information field 312 may include information regarding skills or attributes that can be used to route work items among resources 112. The skills described in the skills information field 312 may correspond to technical skills, certifications, types of work items that the agent is allowed (or disallowed) to handle, areas of expertise, allowable media types, etc.

The preferences information field 316 may comprise data which describes one or more work item preferences for an agent. In some embodiments, the preferences information field 316 may be pre-provisioned by the agent manually (e.g., the agent is allowed to select preferred types of work items, preferred media types, preferred language/native language, etc.). Alternatively, or in addition, the preferences information field 316 may be dynamically updated with inferred preferences based on the agent's performance and, if applicable, identifying the types of work items that the agent selects when given an option. This field may also contain information related to types of rewards that an agent or group of agents prefers (e.g., as a single preference or in the form of an ordered list).

The rewards history information field 320 may comprise information that describes what types of rewards an agent or group of agents has received, what types of rewards an agent or group of agents is eligible to receive, what types of rewards an agent or group of agents is currently receiving, the performance metrics associated with such rewards (e.g., the performance thresholds that were met to enable the agent or group of agents to receive the reward), and so on. The information from the reward history information field 320 may be populated and/or accessed by the reward module 124. Moreover, the reward module 124 may utilize the reward history information 320 as a mechanism for assigning one or more attributes to an agent's skills (e.g., agent reward skill=eligible for reward Y). This attribute information can be accessed by the work assignment engine 120 during a work item routing process and, if applicable, the reward history 320 may cause the work assignment engine 120 to route the agent a reward rather than the next eligible work item. Further still, the rewards history information field 320 may be analyzed to determine if an agent is eligible for a reward (e.g., an agent that just received a reward within a predetermined amount of time may not be eligible to receive another reward for an additional amount of time).

Figure 4:
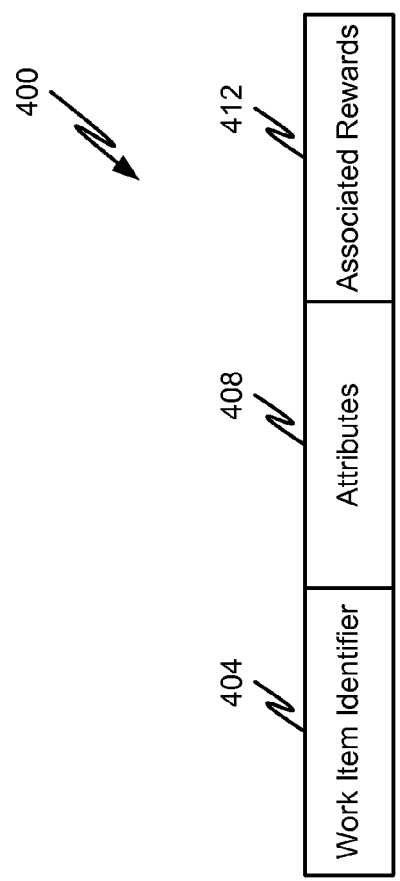
FIG. 4 is a block diagram depicting a second data structure used in accordance with embodiments of the present disclosure.

With reference now to FIG. 4, additional details of a data structure 400 used to define work items in the work pool 204 will be described in accordance with embodiments of the present disclosure. Specifically, each work item may have a corresponding data structure 400 which identifies the work item in an identifier information field 404, various attributes of the work item in an attributes information field 408, and associated rewards in a rewards information field 412.

In some embodiments, the work item identifier field 404 comprises information which uniquely identifies the work item in the contact center 100 at a given moment in time. As with the agent identifier 304, the work item identifier 404 may comprise any combination of alphanumeric characters to identify a work item, a customer associated with the work item, a contact or media type associated with the work item, etc.

The attributes information field 408 may comprise data that describes the attributes of a work item. The attributes of a work item may be in the form of one or more bits (e.g., bit values in a bitmap 208) indicating whether the work item has a particular attribute, skill requirement, routing requirement, or not. Of course, other mechanisms of data description (e.g., strings, characters, alphanumeric values, equations, etc.) may be used to describe the attributes/skill requirements of a work item in the attributes information field 408.

The associated rewards information field 412 may comprise data which describes whether a particular work item has an associated reward. In other words, the reward module 124 may be configured to alter the attributes of one or more work items in the work pool 204 if an agent or group of agents is designated to receive that particular work item as part of a reward. In this way, the associated rewards information field 412 may be incorporated into the attributes field 408 and, in certain circumstances, may cause the work assignment engine 120 to identify a particular agent (who is set to receive the reward) as the agent to receive the work item. This allows the rewards to be distributed to eligible agents/resources 112 without requiring the work assignment engine 120 to alter its routing logic. Rather, the overall routing logic can be controlled by the reward module 124 by simply altering one or more attributes of work items in the work pool 204. Of course, other embodiments where the reward module 124 actually does communicate with and provide instructions to the work assignment engine 120 may not require the associated rewards information field 412 (e.g., because the reward module 124 is allowed to alter the routing logic in the work assignment engine 120 to route rewards to agents).

Figure 5:
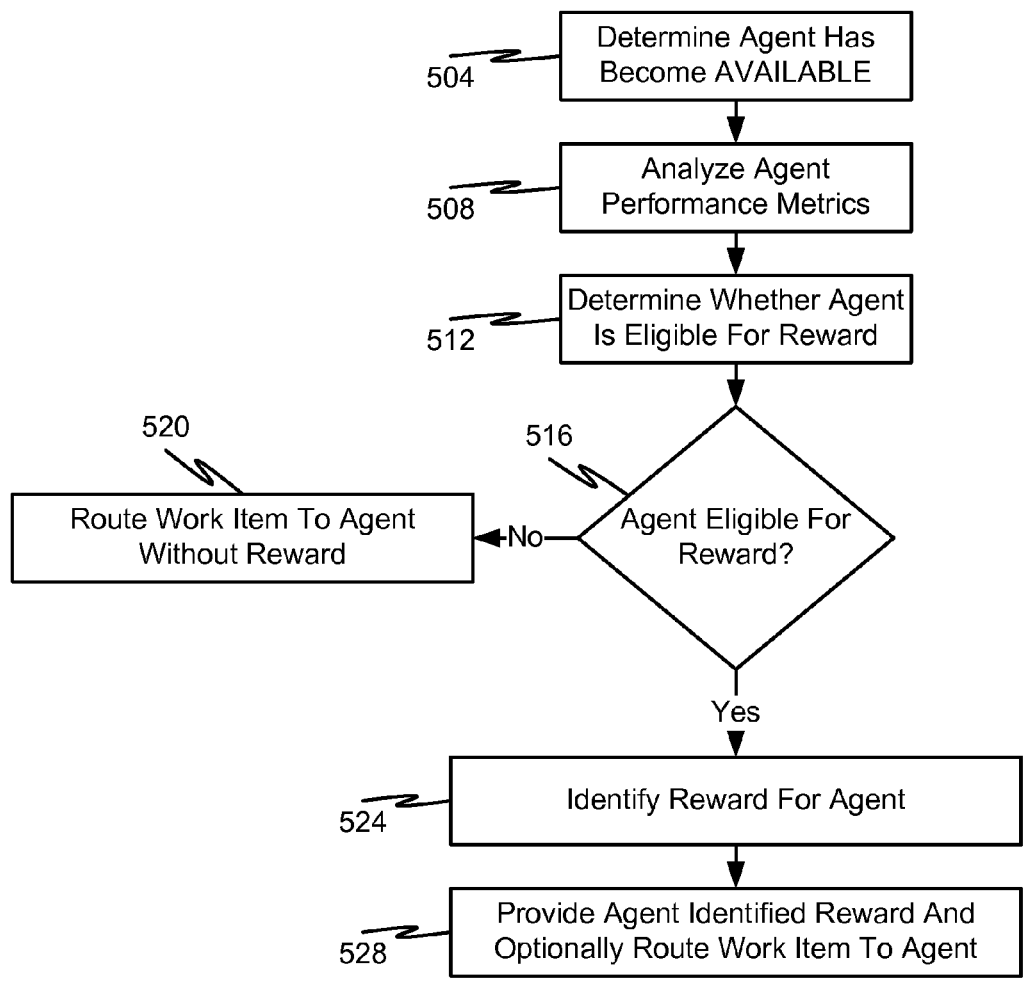
FIG. 5 is a flow diagram depicting a method of rewarding agent behavior in accordance with embodiments of the present disclosure.

With reference now to FIG. 5, a method of identifying agents as eligible to receive rewards and subsequently providing rewards to the identified agents will be described in accordance with at least some embodiments of the present disclosure. Although the following method(s) will be described in connection with the example of a single agent, it should be appreciated that embodiments of the present disclosure are not so limited and any concept described in connection with a single agent may be applied to routing rewards to a group of agents.

The method may be initiated when the work assignment mechanism 116, or a component thereof, determines that an agent has become AVAILABLE (e.g., has completed processing a work item and is ready for another work item, has returned from a break or AUX state, has stated a shift, etc.) (step 504). Of course, the following method may also be initiated in response to receiving any type of stimulus, regardless of whether or not an agent has currently become AVAILABLE.

The method continues by analyzing one or more of the selected agent's performance metrics as are described in the performance metrics information field 308 (step 508). The analysis may comprise analyzing a single performance metric and comparing the value of that metric with a predetermined rewards threshold, which is associated with a particular reward or type of reward. Alternatively, or in addition, the analysis may comprise analyzing multiple performance metrics against one or more rewards thresholds, where each of the one or more rewards thresholds correspond to receiving a different type of reward or correspond to a different type of performance metric. In some embodiments, the reward threshold, if satisfied by the necessary performance metric(s), may identify that the agent is eligible for a particular reward (steps 512 and 516). Alternatively, satisfaction of one or more reward thresholds may simply indicate that an agent is eligible for a reward, even though the specific reward is not associated with the threshold.

If the selected agent is not determined to be eligible for a reward, then the method proceeds with the work assignment engine 120 routing a work item to the agent in the absence of a reward (step 520). On the other hand, if the selected agent is determined to be eligible for a reward, the reward to be provided to the agent is identified by the agent monitor element 136 (step 524). In some embodiments, this information is easily obtained because the reward threshold(s) that were satisfied by the agent's performance metric(s) may have a corresponding reward, which ultimately become the identified reward. On the other hand, the agent monitor element 136 may identify the reward for the agent by providing a query (e.g., YOU ARE ELIGIBLE FOR ONE OF THE FOLLOWING REWARDS, PLEASE SELECT ONE) to the agent and basing the decision on the agent's response thereto. As another non-limiting example, the types of rewards that are currently available for distribution to agents may depend upon the current state of the contact center and the agent monitor element 136 may identify an appropriate reward from the list of rewards eligible for distribution. It should be appreciated that combinations of the above decision processes may be employed by the agent monitor element without departing from the scope of the present disclosure.

Once the appropriate reward(s) has been identified for the selected agent, the method continues with the routing control element 140 altering the contact routing logic of the work assignment mechanism 116 to cause the identified reward to be provided to the agent (step 528). As can be appreciated, the reward may be in the form of a work item (or a particular work item having certain attributes), which means that a work item may be simultaneously provided to the selected agent along with the reward. It should also be noted that the reward may be provided in the form of a break, in which case a mandatory break-type work item may be routed to the agent, thereby forcing the agent to take a break for a predetermined amount of time.

In some embodiments, routing logic of the work assignment mechanism 116 may be altered by having the routing control element 140 provide one or more instructions to the work assignment engine 120 to route a particular work item or reward-type work item to a particular agent. In some embodiments, the routing logic of the work assignment mechanism 116 may be altered by having the routing control element 140 adjust attributes of one or more work items or agent attributes in the bitmaps/tables 128 to cause the work assignment engine 120 to route a particular work item or reward to a particular agent without actually requiring the work assignment engine 120 to employ a different routing logic. Combinations of the above-noted mechanisms may also be used to adjust the routing logic of the work assignment mechanism 116.

Once the identified reward has been provided to the selected agent, the method may end or at least the reward history information field 320 for the selected agent may be updated to reflect that a reward has been provided to the agent.

Figure 6:
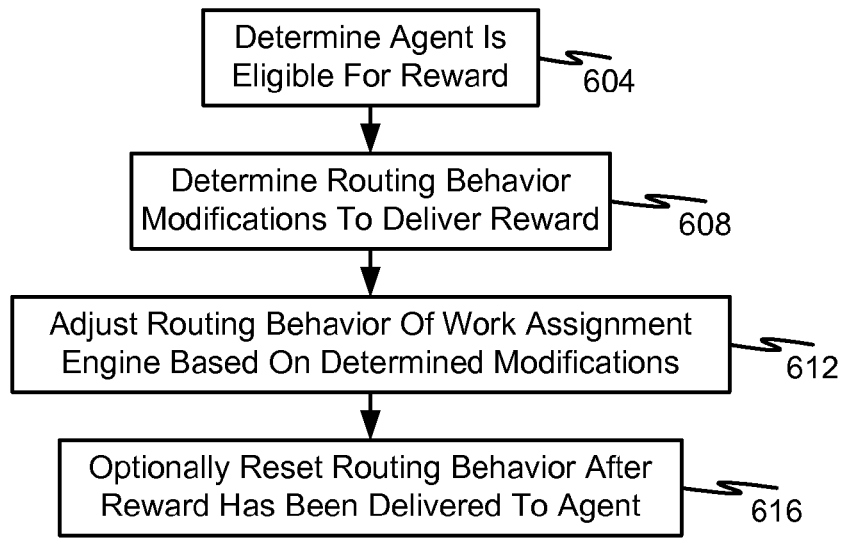
FIG. 6 is a flow diagram depicting a method of adjusting routing behavior of a work assignment mechanism to provide one or more rewards to an agent in accordance with embodiments of the present disclosure.

Referring now to FIG. 6, a method of adjusting routing behavior of a work assignment mechanism 116 to provide one or more rewards to an agent in accordance with embodiments of the present disclosure. The method begins when it is determined that an agent is eligible for one or more rewards (step 604). The routing control element 140 then determines what types of routing behavior modifications should be made to enable delivery of the reward(s) to the agent (step 608). As noted above, the routing behavior modifications may be achieved by changing logic in the work assignment engine 120, changing attributes of one or more existing work items, inserting a break or reward-type work item into the work pool 204, or combinations thereof.

Depending upon the determined routing behavior changes, the method continues with the routing control element 140 making the determined adjustments at one or more components in the work assignment mechanism 116 (step 612). The modification in the routing behavior then results in the identified reward being delivered or provided to the selected agent. In some embodiments, an additional optional step may be performed whereby the routing behavior changes that were made to deliver the reward are reversed after the reward is delivered to the agent (step 616). In some embodiments, this may occur automatically by virtue of a work item and/or reward being routed to the selected agent and, therefore, exiting the work pool 204. In some embodiments, this optional step may require an additional processing step by the routing control element 140 to instruct whatever component of the work assignment mechanism 116 to reverse whatever changes were made to route the reward. Of course, these instructions may be provided simultaneously with the instructions to alter the routing behavior (e.g., as instructions to temporarily change some aspect of routing logic).

Figure 7:
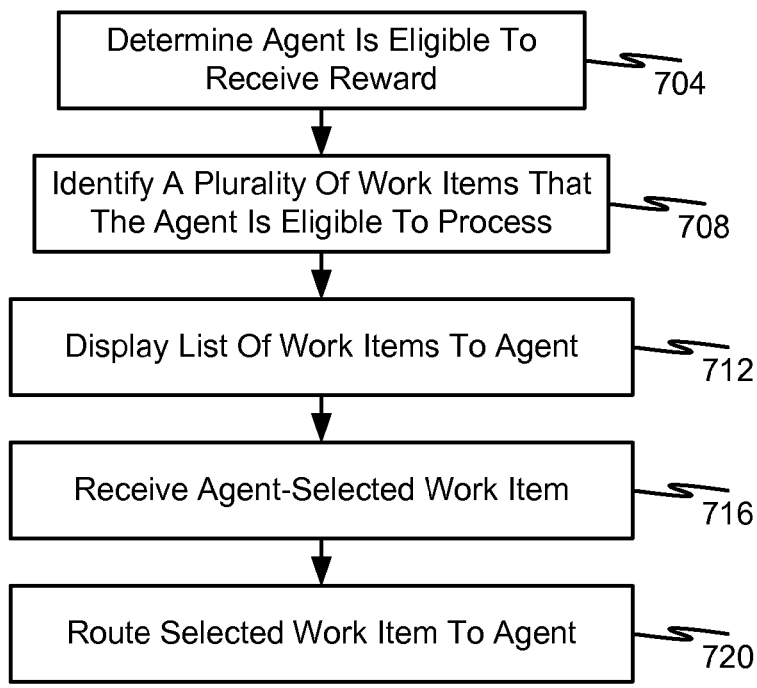
FIG. 7 is a flow diagram depicting a specific method of rewarding agent behavior in accordance with embodiments of the present disclosure.

With reference now to FIG. 7, a specific and non-limiting example of the type of reward that may be provided to an eligible agent will be described in accordance with at least some embodiments of the present disclosure. The method begins when a selected agent is determined to be eligible for a reward (step 704). In this particular example, the reward may correspond to providing the agent with the option to select his/her next work item for processing.

Accordingly, the method may continue with the reward module 124 or a sub-component thereof communicating with the work assignment engine 120 to identify a plurality of work items that the selected agent is eligible to process (step 708). The plurality of work items may correspond to the next X work items in the work pool that would otherwise be scheduled for routing. In some embodiments, the plurality of work items identified in step 708 may correspond to the next five or ten work items having the longest amount of wait time in the work pool 204 that the selected agent is qualified to process. In some embodiments, the plurality of work items identified in step 708 may correspond to three or four of the highest projected revenue work items in the work pool 204, regardless of how long the work items have been waiting for processing. As can be appreciated, the plurality of work items can be determined by analyzing the attributes of every work item in the work pool 204.

Thereafter, a list that identifies the plurality of work items identified in step 708 is provided to the selected agent via the agent's work station (e.g., computing device, telephone, etc.) (step 712). The agent is then allowed to select a work item from the plurality of work items (step 716). In some embodiments, the agent may select a subset of the work items and assign a preference or ranking to each selection. This may enable the work assignment engine 120 to provide the agent with his/her second selection if that particular work item has a wait time that exceeds a wait time of the first selected work item by more than a predetermined amount (e.g., the second priority selected work item has a wait time that is X % larger than the wait time of the first priority selected work item).

Based on the input received from the agent, the work assignment engine 120 the provides the eligible agent with the selected work item (step 720). As can be appreciated, the work item provided to the agent may not necessarily correspond to the agent's first priority selected work item, especially if contact center conditions dictate that such an assignment would violate some other goal or objective of the contact center.

It should be appreciated that while embodiments of the present disclosure have been described in connection with a queueless contact center architecture, embodiments of the present disclosure are not so limited. In particular, those skilled in the contact center arts will appreciate that some or all of the concepts described herein may be utilized in a queue-based contact center or any other traditional contact center architecture.

Furthermore, in the foregoing description, for the purposes of illustration, methods were described in a particular order. It should be appreciated that in alternate embodiments, the methods may be performed in a different order than that described. It should also be appreciated that the methods described above may be performed by hardware components or may be embodied in sequences of machine-executable instructions, which may be used to cause a machine, such as a general-purpose or special-purpose processor (GPU or CPU) or logic circuits programmed with the instructions to perform the methods (FPGA). These machine-executable instructions may be stored on one or more machine readable mediums, such as CD-ROMs or other type of optical disks, floppy diskettes, ROMs, RAMs, EPROMs, EEPROMs, magnetic or optical cards, flash memory, or other types of machine-readable mediums suitable for storing electronic instructions. Alternatively, the methods may be performed by a combination of hardware and software.

Specific details were given in the description to provide a thorough understanding of the embodiments. However, it will be understood by one of ordinary skill in the art that the embodiments may be practiced without these specific details. For example, circuits may be shown in block diagrams in order not to obscure the embodiments in unnecessary detail. In other instances, well-known circuits, processes, algorithms, structures, and techniques may be shown without unnecessary detail in order to avoid obscuring the embodiments.

Also, it is noted that the embodiments were described as a process which is depicted as a flowchart, a flow diagram, a data flow diagram, a structure diagram, or a block diagram. Although a flowchart may describe the operations as a sequential process, many of the operations can be performed in parallel or concurrently. In addition, the order of the operations may be re-arranged. A process is terminated when its operations are completed, but could have additional steps not included in the figure. A process may correspond to a method, a function, a procedure, a subroutine, a subprogram, etc. When a process corresponds to a function, its termination corresponds to a return of the function to the calling function or the main function.

Furthermore, embodiments may be implemented by hardware, software, firmware, middleware, microcode, hardware description languages, or any combination thereof. When implemented in software, firmware, middleware or microcode, the program code or code segments to perform the necessary tasks may be stored in a machine readable medium such as storage medium. A processor(s) may perform the necessary tasks. A code segment may represent a procedure, a function, a subprogram, a program, a routine, a subroutine, a module, a software package, a class, or any combination of instructions, data structures, or program statements. A code segment may be coupled to another code segment or a hardware circuit by passing and/or receiving information, data, arguments, parameters, or memory contents. Information, arguments, parameters, data, etc. may be passed, forwarded, or transmitted via any suitable means including memory sharing, message passing, token passing, network transmission, etc.

While illustrative embodiments of the disclosure have been described in detail herein, it is to be understood that the inventive concepts may be otherwise variously embodied and employed, and that the appended claims are intended to be construed to include such variations, except as limited by the prior art.

What is claimed is:

1. A method, comprising:
   determining by a server of a contact center that an agent of a plurality of the contact center agents has met a performance goal defined by one or more thresholds;
   based on determining that the agent has met the performance goal, the server identifying a reward which the agent is eligible to receive, the reward being a preferred work item in a work pool over at least one other work item in the work pool, wherein the work items in a work pool are each associated with contacts of the contact center;
   altering a routing logic of a work assignment mechanism in the contact center so as to provide the agent with the reward; and
   identifying a plurality of work items from the work pool;
   wherein the plurality of work items correspond to a predetermined number of work items in the work pool that have a higher wait time than work items not in the plurality of work items and wherein the plurality of work items correspond to work items that the agent is eligible to process; and
   wherein the plurality of work items further correspond to a predetermined number of work items in the work pool that have a higher projected revenue than work items not in the plurality of work items and wherein the plurality of work items correspond to work items that the agent is eligible to process.

2. The method of claim 1, wherein altering the routing logic of the work assignment mechanism comprises changing a routing algorithm, in a work assignment engine of the work assignment mechanism, to a different routing algorithm.

3. The method of claim 1, wherein altering the routing logic of the work assignment mechanism comprises changing one or more attributes of the work item in a work pool.

4. The method of claim 3, wherein the work item corresponds to at least one of a break-type work item and a reward-type work item and wherein the one or more attributes of the work item are changed by altering one or more values in a bitmap maintained by the work assignment mechanism and referenced by a work assignment engine when making work item routing decisions.

5. The method of claim 3, wherein the work item corresponds to a work item that is selected by the agent from a list of potential work items waiting for processing in the work pool.

6. The method of claim 5, further comprising:
   describing each of the plurality of work items in the list of potential work items;
   providing the list of potential work items to the agent after the agent becomes AVAILABLE; and
   receiving the agent's selection of the work item in response to providing the list of potential work items to the agent.

7. The method of claim 1, wherein the agent is determined to have met the one or more performance goals by comparing one or more performance metrics associated with the agent to the one or more thresholds.

8. The method of claim 7, wherein the one or more performance metrics comprise at least one of the following: First Call Resolution, $/contact, $/min, Profit/contact, Profit/min, Average Handle Time, Abandon Rate, agent preference, customer satisfaction, closure rate, % commit to pay, % up-sell, and % cross-sell.

9. A non-transitory computer readable medium having stored thereon instructions that cause a computing system of a contact center to execute a method, the instructions comprising:
   instructions configured to determine that an agent has met a performance goal in the contact center that is defined by one or more thresholds;
   instructions configured to, based on determining that the agent has met the performance goal, identify a reward which the agent is eligible to receive, the reward being a preferred work item in a work pool over at least one other work item in the work pool, wherein the work items in a work pool are each associated with contacts of the contact center;
   instructions configured to alter a routing logic of a work assignment mechanism in the contact center so as to provide the agent with the reward; and
   wherein the plurality of work items correspond to a predetermined number of work items in the work pool that have at least one of a higher wait time and higher projected revenue than work items not in the plurality of work items and wherein the plurality of work items correspond to work items that the agent is eligible to process; and
   wherein the plurality of work items further correspond to a predetermined number of work items in the work pool that have a higher projected revenue than work items not in the plurality of work items and wherein the plurality of work items correspond to work items that the agent is eligible to process.

10. The non-transitory computer readable medium of claim 9, wherein altering the routing logic of the work assignment mechanism comprises changing a routing algorithm, in a work assignment engine of the work assignment mechanism, to a different routing algorithm.

11. The non-transitory computer readable medium of claim 9, wherein altering the routing logic of the work assignment mechanism comprises changing one or more attributes of the work item in a work pool.

12. The non-transitory computer readable medium of claim 11, wherein the work item corresponds to at least one of a break-type work item and a reward-type work item and wherein the one or more attributes of the work item are changed by altering one or more values in a bitmap maintained by the work assignment mechanism and referenced by a work assignment engine when making work item routing decisions.

13. The non-transitory computer readable medium of claim 11, wherein the work item corresponds to a work item that is selected by the agent from a list of potential work items waiting for processing in the work pool.

14. The non-transitory computer readable medium of claim 13, further comprising:
   instructions configured to identify a plurality of work items from the work pool;
   instructions configured to describe each of the plurality of work items in the list of potential work items;
   instructions configured to provide the list of potential work items to the agent after the agent becomes AVAILABLE; and
   instructions configured to receive the agent's selection of the work item in response to providing the list of potential work items to the agent.

15. A contact center, comprising:
   a work assignment mechanism including:
      a work assignment engine configured to distribute work items among a plurality of resources in the contact center, the plurality of resources including a plurality of agents; and
      a reward module configured to determine that an agent in the plurality of agents has met a performance goal that is defined by one or more thresholds, based on determining that the agent has met the performance goal, identify a reward which the agent is eligible to receive, and then alter a routing logic of the work assignment mechanism so as to provide the agent with the reward;
   wherein, the reward being a preferred work item in a work pool over at least one other work item in the work pool, wherein the work items in a work pool are each associated with contacts of the contact center;
   identifying a plurality of work items from the work pool; and
   wherein the plurality of work items correspond to a predetermined number of work items in the work pool that have a higher projected revenue than work items not in the plurality of work items and wherein the plurality of work items correspond to work items that the agent is eligible to process; and
   wherein the plurality of work items further correspond to a predetermined number of work items in the work pool that have a higher projected revenue than work items not in the plurality of work items and wherein the plurality of work items correspond to work items that the agent is eligible to process.

16. The contact center of claim 15, wherein altering the routing logic of the work assignment mechanism comprises at least one of (i) changing a routing algorithm employed by the work assignment engine to a different routing algorithm and (ii) changing one or more attributes of a work item, the one or more attributes corresponding to an attribute analyzed by the work assignment engine in connection with making a work item routing decision.

17. The contact center of claim 15, wherein the work assignment mechanism further comprises a plurality of bitmaps that contain bit values to describe attributes of work items and attributes of the plurality of agents and wherein the work assignment engine analyzes every work item represented in the plurality of bitmaps every time a work assignment decision is made.

* * * * *